March 23, 1954  L. E. SVENSSON  2,673,060
PHOTOELECTRICALLY CONTROLLED SCALE
Filed Dec. 6, 1950

Inventor
Lars Erik Svensson
By Robert E. Burns
Attorney

Patented Mar. 23, 1954

2,673,060

UNITED STATES PATENT OFFICE 2,673,060

PHOTOELECTRICALLY CONTROLLED SCALE

Lars Erik Svensson, Tullinge, Sweden, assignor to Aktiebolaget Result, Stockholm, Sweden, a company of Sweden Application December 6, 1950, Serial No. 199,444

1 Claim. (Cl. 249—2)

The present invention relates to photo-electrically controlled scales for automatically or semi-automatically weighing out a series of equal quantities of a usually granular or pulverulent material.

It is one of the objects of the invention to obtain a scale of the character described by which a large number of weighings can be performed per unit of time and this number can be increased or reduced according to the accuracy of weighing required in each case. Another object is to make possible to adjust the sensitiveness of the scale simply by mechanical means. A further object is to provide means for limiting the movements of the movable parts of the scale without jeopardizing the proper control by the photo-electrical means.

The invention will now be described with reference to the accompanying drawing illustrating the invention by way of example only.

Figure 1:
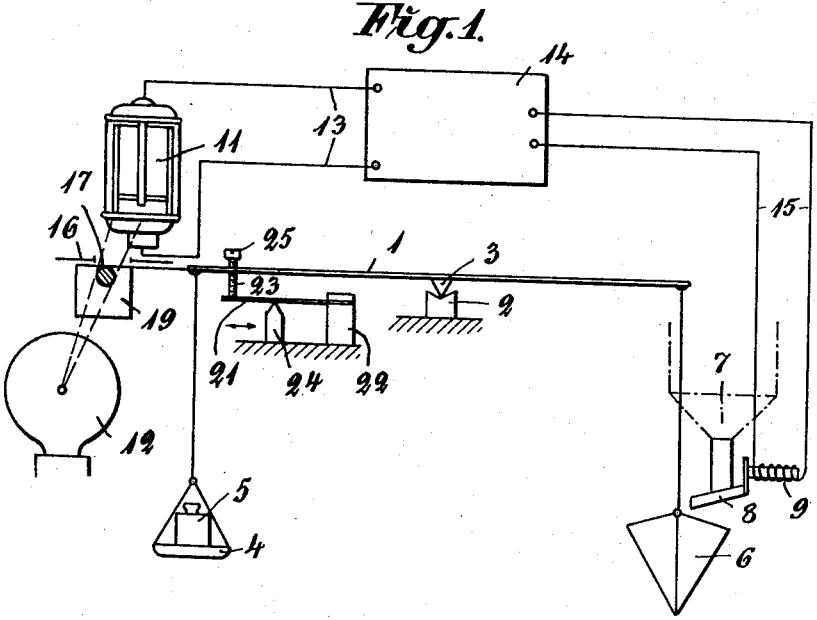
Figure 2:
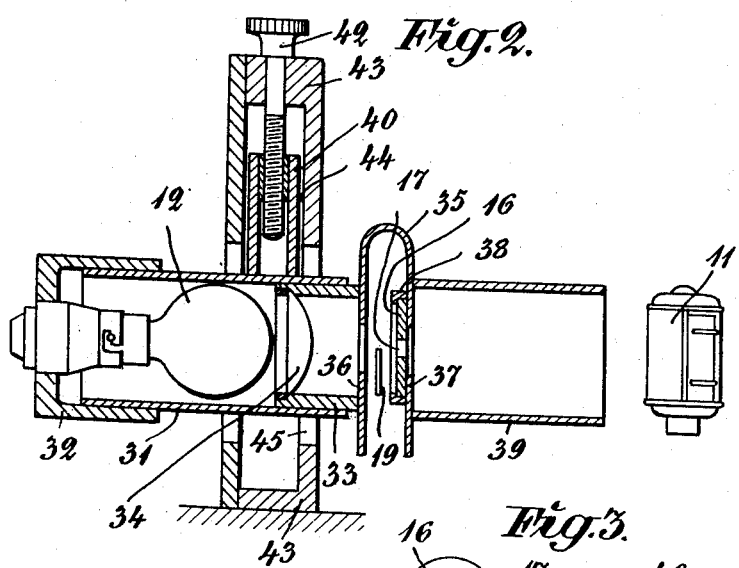
Figure 3:
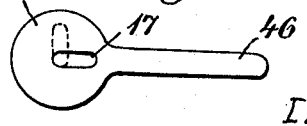

In the drawing Fig. 1 illustrates diagrammatically a scale embodying the invention, and Fig. 2 is a vertical section, in part, of the adjustable photo-electrical arrangement of the scale according to Fig. 1, and Fig. 3 is a plan view of a diaphragm which may be used in the device illustrated in Fig. 2.

The scale beam 1 is balancing in conventional way on a fulcrum 2 by a knife edge 3 located approximately at the middle of the beam. At the one end of the beam is the weight pan 4 suspended for carrying the weight 5, and at the other end is a container 6 suspended for receiving the material to be weighed, which latter is supplied from a store box 7 by means of the feed board 8 oscillated in conventional way by an electromagnetic vibrator 9. The vibrator is actuated by a light sensitive photocell 11, which, exposed to radiation from the electric bulb 12, generates a current through leads 13 which is magnified or transformed in usual way in the amplifier or relay 14, which in turn supplies the actuating current to vibrator 9 through leads 15.

Between the bulb 12 and the photocell 11 is a stationary diaphragm 16, having a slot 17 limiting a light beam impinging the photocell 11. In a plane perpendicular to the light beam from the bulb 12 to the light sensitive part of the photocell 11 a movable screen 19, secured to the scale beam 1, is movable so as in certain positions of beam 1 more or less to screen off the radiation from the bulb 12.

The device described is quite conventional and is easily understood by those skilled in the art.

Obviously several of the elements of this device can be replaced by equivalents known in the art. The vibrator can be replaced by, for instance, revolutionary feeding implements and the scale may be of the spring type, in which the container is suspended in a yielding spring or the like, the essential thing being that the feeding device is controlled by a photocell and the photocell is controlled by a member attached to a part of the scale movable in response to the degree of filling of material to be weighed.

In scales of the present kind stopper members are usually arranged for limiting the tilting movement of the scale beam, so that the latter is movable only near the position of equilibrium but sufficiently to effect the screening operation of screen 19. Although this arrangement will prevent the scale beam from excessive movements, the beam will nevertheless have a tendency to move too fast at the end of the movement near the point of equilibrium so that the scale may bump against a stopper and the weighing become inexact.

In order to eliminate this drawback, according to one embodiment of the invention, a resilient stopper is provided counter-acting the weight 5. This stopper consists, for instance, of a plate spring 21 secured rigidly to a stationary support 22. An abutting arm 23 secured to the beam 1 is arranged to engage the outer end of the spring as long as the beam is out of its position of equilibrium due to the tilting action of weight 5. The abutment 23 is adjustable in beam 1 as indicated by the screw 25 so that it can be set in a position where the influence of the spring ceases just as the scale beam 1 has reached its position of equilibrium. The spring power may be regulated by a movable support 24 which can be removed along the spring between the ends thereof so as to compensate for the different weights of the various weight pieces 5 to be used. By this resilient stopper or any equivalent contrivance presenting a successively decreasing counter-action to the weight, the filling of container 6 will proceed without noticeable movement of the beam 1 for the major period of filling so that the controlling action of the photoelectrical equipment will not set in until at the end of the filling when it is very smooth and precise.

In order to obtain an absolutely correct outweighing the screen 19 shall be so arranged that in the position of equilibrium of the scale beam the screen just covers the last portion of the slot 17 so that the feed by the board 8 will cease exactly when the exact weight has been attained. If, however, the scale is adjusted in that manner the position of equilibrium will be approached extremely slowly at the end of the filling period. Therefore, according to the present invention, the means for exposing the light sensitive part of the photocell 11 to radiation from bulb 12 are made adjustable.

Adjusting means of this kind are illustrated in Fig. 2 showing the photoelectric unit. In either end of cylindric housing 31 is inserted the electric bulb 12 fitted in the slidable sleeve 32 and the holder 33 for a lens 34 and a bracket 35 for the diaphragm equipment. Bracket 35 is made of a double folded sheet so as to form a free interspace between the parts 36 and 37 for the movable screen 19 to move freely. Each part 36, 37 has an opening located about the axis of the lens so that the light from the bulb can pass therethrough. On the inner side of the remote part 37 is the diaphragm 16 mounted in a holder 38 and on the outer side is a protection cylinder 39 secured coaxially to the axis of the lens. All these elements form together a unit carried by a threaded stud 40 which is, in turn, supported by the thumb screw 42 rotatably mounted in a support 43 in which stud 40 and housing 31 are slidably fitted and guided by surfaces 44 and 45, respectively. The light beam emanating from this unit is arranged to impinge upon the light sensitive part of the photocell 11.

Normally slot 17 on the diaphragm 16 is so positioned that in the position of equilibrium of the scale beam 1 the screen 19 will just screen off the entire slot. The filling will in such case approach the predetermined weight very slowly. If, however, the light unit be raised more or less by turning the thumb screw 42 a greater or smaller portion of the light bundle passes the diaphragm 16 when the screen 19 has reached the position of equilibrium. The greater this remaining bundle is the more rapidly the position of equilibrium will be reached, but at the cost of the sensitiveness of the weighing. By the described arrangement it is possible to adjust the sensitiveness of the scale according to the exactness required in each case.

Additionally or alternatively to the vertical movability of the light unit the diaphragm 16 can be shaped so that the sensitiveness may be regulated in a simple way. In the circular disc 16 as illustrated in Fig. 3 the slot 17 is positioned along a diameter and substantially only on the one side of the centre so that when the disc is turned by the handle 46 the slot will take a position forming a greater or smaller angle to its former extension as indicated by the dashed and full lines, respectively.

It will be easily understood that by this simple implement an adjustment of the remaining light bundle can be obtained. Supposing that in the position of equilibrium the screen 19 screens off the horizontally positioned slot 17 up to the middle line thereof half of the maximum light bundle is admitted to pass through. In the vertical position of the slot, however, practically the whole bundle is let through. In intermediate positions any magnitude of the light bundle between these extremes can be obtained. If the screen is arranged to screen off, in the position of equilibrium, just up to the upper border of the horizontally positioned slot 17 the margin of regulation of radiation extends from nil. In this case the light passing through in the vertical position of the slot is less than in the former case.

What is claimed is:

In a scale balance having a scale beam balanced about a fulcrum, a container for material to be weighed mounted at one end of said beam, a scale pan for the measuring weight mounted at the other end of the beam, adjustable means for partially outbalancing the measuring weight on the scale pan, said adjustable means comprising a spring disposed adjacent the scale beam and positioned to be put under a continuously increasing tension by the scale beam as it leaves its position of equilibrium under the influence of the measuring weight, a photoelectric means for controlling the supply of material to be weighed by said beam, said means comprising a light source, an apertured diaphragm member interposed between said light source and said photocell, said light source, said photocell, and said diaphragm member lying in substantially a straight line, and a screen disposed between said diaphragm and said light source, said screen being secured to an end of said beam and being movable with said beam at right angles to said straight line for controlling the amount of light passing through the aperture in said diaphragm member and being positioned relative to said diaphragm in such manner that the light from said light source will be at least partly interrupted by said screen in the position of equilibrium of said beam, at least one of said light source, said diaphragm member, and said screen being adjustable perpendicularly to said straight line for regulating the quantity of light passing from said light source to said photocell upon movement of said beam.

LARS ERIK SVENSSON.

References Cited in the file of this patent

UNITED STATES PATENTS

| Number | Name | Date |
|---|---|---|
| Re. 12,335 | Bond | Apr. 4, 1905 |
| 1,746,562 | Sounitza | Feb. 11, 1930 |
| 1,807,644 | Walker | June 2, 1931 |
| 1,970,579 | Schweitzer | Aug. 21, 1934 |
| 1,985,044 | Lyle | Dec. 18, 1934 |
| 2,055,730 | Rees | Sept. 29, 1936 |
| 2,067,744 | Williams | Jan. 12, 1937 |
| 2,071,443 | Weckerly | Feb. 23, 1937 |
| 2,197,514 | Barnes | Apr. 16, 1940 |
| 2,204,134 | Howard | June 11, 1940 |
| 2,319,193 | Walter | May 11, 1943 |
| 2,319,908 | Walter | May 25, 1943 |
| 2,348,372 | Weckerly | May 9, 1944 |

FOREIGN PATENTS

| Number | Country | Date |
|---|---|---|
| 726,355 | Germany | Oct. 12, 1942 |